(12) United States Patent
Eisenberger et al.

(10) Patent No.: US 9,061,237 B2
(45) Date of Patent: Jun. 23, 2015

(54) SYSTEM AND METHOD FOR REMOVING CARBON DIOXIDE FROM AN ATMOSPHERE AND GLOBAL THERMOSTAT USING THE SAME

(71) Applicants: Peter Eisenberger, Princeton, NJ (US); Graciela Chichilnisky, New York, NY (US)

(72) Inventors: Peter Eisenberger, Princeton, NJ (US); Graciela Chichilnisky, New York, NY (US)

(*) Notice: Subject to any disclaimer, the term of this patent is extended or adjusted under 35 U.S.C. 154(b) by 0 days.

(21) Appl. No.: 14/515,261

(22) Filed: Oct. 15, 2014

(65) Prior Publication Data

US 2015/0027308 A1 Jan. 29, 2015

Related U.S. Application Data (63) Continuation of application No. 14/019,328, filed on Sep. 5, 2013, now Pat. No. 8,894,747, which is a continuation of application No. 12/868,915, filed on Aug. 26, 2010, now abandoned, which is a continuation of application No. 12/124,864, filed on May 21, 2008, now abandoned, which is a continuation-in-part of application No. 11/825,468, filed on Jul. 6, 2007, now abandoned, and a continuation-in-part of application No. 11/805,477, filed on May 22, 2007, now abandoned, and a continuation-in-part of application No. 11/805,271, filed on May 21, 2007, now abandoned.

(51) Int. Cl.
*B01D 53/02* (2006.01)
*B01D 53/04* (2006.01)

(52) U.S. Cl.
CPC .......... *B01D 53/04* (2013.01); *B01D 2257/504* (2013.01); *Y02C 10/08* (2013.01)

(58) Field of Classification Search
CPC .................. B01D 2251/304; B01D 2251/604; B01D 2257/504; B01D 2258/0233; B01D 53/1475; B01D 53/62; F13J 15/02; Y02C 10/04; Y02C 10/06; Y02C 10/08
See application file for complete search history.

(56) References Cited

U.S. PATENT DOCUMENTS

| | | | | |
|---|---|---|---|---|
| 3,466,138 A | * | 9/1969 | Routsis et al. | 429/410 |
| 6,350,298 B1 | * | 2/2002 | Su et al. | 95/96 |
| 6,547,854 B1 | * | 4/2003 | Gray et al. | 95/139 |
| 2005/0027081 A1 | * | 2/2005 | Okushita et al. | 525/419 |
| 2006/0051274 A1 | * | 3/2006 | Wright et al. | 423/220 |
| 2007/0004023 A1 | * | 1/2007 | Trachtenberg | 435/266 |
| 2008/0090480 A1 | * | 4/2008 | Akimoto et al. | 442/328 |
| 2008/0264029 A1 | * | 10/2008 | Sepaniak | 56/202 |
| 2008/0289319 A1 | * | 11/2008 | Eisenberger et al. | 60/274 |
| 2008/0289495 A1 | * | 11/2008 | Eisenberger et al. | 95/107 |
| 2008/0289499 A1 | * | 11/2008 | Eisenberger et al. | 95/139 |
| 2008/0289500 A1 | * | 11/2008 | Eisenberger et al. | 95/139 |

* cited by examiner

*Primary Examiner* — Christopher P Jones
(74) *Attorney, Agent, or Firm* — Paul J. Sutton; Barry G. Magidoff (57) ABSTRACT

A system for removing carbon dioxide from an atmosphere to reduce global warming including an air extraction system that collects carbon dioxide from the atmosphere through a medium and removes carbon dioxide from the medium; a sequestration system that isolates the removed carbon dioxide to a location for at least one of storage and which can increase availability of renewable energy or non-fuel products such as fertilizers and construction materials; and one or more energy sources that supply process heat to the air extraction system to remove the carbon dioxide from the medium and which can regenerate it for continued use.

8 Claims, 7 Drawing Sheets

SYSTEM AND METHOD FOR REMOVING CARBON DIOXIDE FROM AN ATMOSPHERE AND GLOBAL THERMOSTAT USING THE SAME

RELATED APPLICATIONS/CLAIM OF PRIORITY

This application is a continuation of, and claims priority from application Ser. No. 14/019,328 filed Sep. 5, 2013, which is a continuation of application Ser. No. 12/868,915 filed Aug. 26, 2010, which is a continuation of Ser. No. 12/124,864 filed May 21, 2008, which in turn is a continuation-in-part of, and claims priority from, each of the following U.S. Patent Applications: (a) U.S. patent application Ser. No. 11/825,468, filed on Jul. 6, 2007, which in turn is a continuation-in-part of U.S. patent application Ser. No. 11/805,477, filed on May 22, 2007, which in turn is a continuation-in-part of U.S. patent application Ser. No. 11/805,271, filed on May 21, 2007, (b) U.S. patent application Ser. No. 11/805,477, filed on May 22, 2007, which is a continuation-in-part of U.S. patent application Ser. No. 11/805,271, filed on May 21, 2007, and (c) U.S. patent application Ser. No. 11/805,271, filed on May 21, 2007, all of which are entitled "System and Method For Removing Carbon Dioxide From An Atmosphere and Global Thermostat Using The Same". The contents of each of the foregoing applications are incorporated herein by reference.

FIELD OF THE INVENTION

The present invention relates to systems and methods for removing greenhouse gases from an atmosphere, and in particular to systems and methods for removing carbon dioxide from an atmosphere.

BACKGROUND OF THE INVENTION

There is much attention currently focused on trying to achieve three energy related and somewhat conflicting energy related objectives: 1) provide affordable energy for economic development; 2) achieve energy security; and 3) avoid the destructive climate change caused by global warming. Many different approaches are being considered to address climate change, including increasing the use of clean, non polluting renewable energy sources such as biofuels, solar, wind and nuclear, attempting to capture and sequester the carbon dioxide emissions from fossil fuel plants, as well as increased conservation efforts. Some of these approaches, such as solar power, have had their large scale implementation blocked due to their current high costs as compared to the cost of fossil based electricity, and other approaches, such as nuclear, are restrained by their environmental and security risks. In fact, the infrastructure and supply for renewable energy is so underdeveloped (e.g., only about 0.01% of our energy is provided by solar) that there is no feasible way to avoid using fossil fuels during the rest of this century if we are to have the energy needed for economic prosperity and avoid energy shortfalls that could lead to conflict.

The climate change threat caused by global warming and the more general recognition of our need to use renewable resources that do not harm our planet has grown steadily since the first Earth Day in 1972. It is mostly undisputed that an increase in the amount of so-called greenhouse gases like carbon dioxide (methane and water vapor are the other major greenhouse gases) will increase the temperature of the planet. These greenhouse gases help reduce the amount of heat that escapes from our planet into the atmosphere. The higher the concentrations of greenhouse gases in the atmosphere the warmer the planet will be. There are complicated feedbacks that cause the amount of carbon dioxide and other greenhouse gases to change naturally even in the absence of human impact. Climate change throughout geological history has caused many extinctions. The concern about the threat of human induced climate change (i.e., global warming) resulted in the Kyoto Protocol that has been approved by over 165 countries and is an international agreement that commits the developed countries to reduce their carbon emissions.

One reason global warming is thought by the Intergovernmental Panel on Climate Change (IPCC) to be a threat is because of the sea level rise resulting from the melting of glaciers and the expansion of the ocean as our planet becomes hotter. Hundreds of millions of people who live just above sea level on islands or on the coasts are threatened by destructive flooding requiring relocation or the building of sea walls if the sea level rises even a meter. There is also a threat to other species from climate change which will destroy ecosystems that cannot adjust to the fast rate of human caused climate change. Additional threats include increased infectious diseases and more extreme weather as well as direct threats from extreme heat.

We can demonstrate the challenge of dealing with global warming using a simple model. Let $C_{CA}(Y_N)$ represent the carbon dioxide added to the atmosphere in year $Y_N$ in gigatonnes per year. Similarly, let $C_{EX}(Y_N)$ equal the amount extracted, $C_{EM}(Y_N)$ the amount emitted by humans and $C_N(Y_N)$ be the amount either added or removed due to natural variations in the carbon cycle. Today, the land stores each year approximately 1.8 gigatonnes ($10^9$ tonnes) of carbon dioxide and the ocean approximately 10.5 gigatonnes (note carbon dioxide is 3.66 times heavier than carbon), while the amount humans add by emissions is about 24 gigatonnes of carbon dioxide. More generally, we have:

$$C_{CA}(Y_N) = -C_{EX}(Y_N) + C_{EM}(Y_N) + C_N(Y_N) \quad (1)$$

$$C_A(Y_{N+1}) = C_A(Y_N) + C_{CA}(Y_N) \quad (2)$$

where $C_A(Y_N)$ is the amount of carbon in the atmosphere in year $Y_N$, 2780 gigatonnes of carbon dioxide today. Other forms of carbon contribute to global warming, most notably methane, although by weight they represent a small component If $C_{EX}(Y_N)$ is set to zero than the only way one could possibly stop adding carbon dioxide to the atmosphere would be to reduce our emissions to be equal to the natural uptake. However, $C_N(Y_N)$ itself varies greatly and can be a net addition to the atmosphere from the much larger natural carbon cycle which adds and subtracts carbon at about 750 gigatonnes of carbon per year. It is the shifts in this natural balance that has caused climate change before our species existed and will also continue to do so in the future. Thus, it is clear that there is no solution that only reduces human contributions to carbon dioxide emissions that can remove the risk of climate change. With air extraction and the capability to increase or decrease the amount of carbon dioxide in the atmosphere one can in principle compensate for other greenhouse gases like methane that can change their concentrations and cause climate change.

Accordingly, there is a broadly recognized need for a system and method for reducing the amount of carbon dioxide in the atmosphere created by burning of fossil fuels and for providing a low cost, non-polluting renewable energy source as a substitute for fossil fuels.

SUMMARY OF THE INVENTION

A system for removing carbon dioxide from an atmosphere to reduce global warming and which can increase availability of renewable energy or non-fuel products such as fertilizers and construction materials according to an exemplary embodiment of the present invention comprises an air extraction system that collects carbon dioxide from the atmosphere through a medium and removes carbon dioxide from the medium by using process heat to heat the medium, a collection system that isolates the removed carbon dioxide to a location for at least one of sequestration, storage and generation of a renewable carbon fuel, and one or more energy sources that provides a supply of process heat to the air extraction system to remove the carbon dioxide from the medium.

In at least one embodiment, the one or more energy sources are selected from the group of energy sources consisting of: fossil fuel, geothermal, nuclear, solar, biomass and other renewable energy sources.

In at least one embodiment, the air extraction system comprises an air contactor that includes the medium to absorb carbon dioxide from the atmosphere.

In at least one embodiment, the air contactor is selected from the group of air contactors consisting of: convection towers, absorption pools, packed scrubbing towers, and gaseous separation systems, some having pancake shaped area substrates with a medium that extracts carbon dioxide from the air. In its broadest context, the present invention contemplates structures in which the air is passed into contact with the medium that extracts the CO2. Currently, in the most likely embodiment the structure would have a large area perpendicular to the air flow and be very thin in the direction of air flow with the medium being a porous substrate on to the surface of which the amine or alternative that binds the CO2 is attached—that medium would also have a large cross-section and be very thin like the contactor structure that houses it).

In at least one embodiment, the medium is selected from the group of mediums consisting of: a liquid, a porous solid, a gas and mixtures thereof.

In at least one embodiment, the medium is an NaOH solution.

In at least one embodiment, the medium comprises an amine.

In at least one embodiment, the air extraction system collects carbon dioxide and the sequestration system isolates the removed carbon dioxide.

In at least one embodiment, the location is underground.

In at least one embodiment, the location is at a remote site upwind from one or more other components of the system.

A method for removing carbon dioxide from an atmosphere to reduce global warming and increase availability of renewable energy according to an exemplary embodiment of the present invention comprises the steps of: collecting air from the atmosphere; removing carbon dioxide from the collected air by using process heat to heat the medium that removes the carbon dioxide from the collected air; and isolating the removed carbon dioxide to a location for at least one of sequestration, storage and generation of a renewable carbon fuel, wherein at least one of the collecting, removing and isolating steps is performed using one or more renewable energy sources.

In at least one embodiment, the step of removing comprises absorbing the carbon dioxide using an absorber, preferably an absorber in the form of a medium carried by a large surface area substrate.

In at least one embodiment, the absorber is an NaOH solution.

In at least one embodiment, the absorber comprises an amine, preferably an amine bound to the surface of (carried by) a large surface area porous substrate.

In at least one embodiment, the step of isolating comprises at least one of mineral sequestration or injection as a pressurized gas into geologic formations.

The principles of the present invention can be used to provide a global thermostat for controlling average temperature of a planet's atmosphere, through the use of a plurality of systems according to the principles of the present invention, each of which is capable of producing a negative carbon dioxide effect on a planet's atmosphere by extracting carbon dioxide from the atmosphere and using process heat for extracting carbon dioxide from the medium and to regenerate the sorbent (medium) for another cycle of adsorption. Thus, the plurality of systems together can effectively extract carbon dioxide from the atmosphere at a rate that is faster than the rate at which the carbon dioxide is increasing in the atmosphere (and can generate a renewable carbon fuel using the extracted gases).

Applicants' preferred concept of extracting carbon dioxide from the atmosphere and using process heat to separate carbon dioxide from the collection medium is a significant way of addressing the global warming problem, and goes against the conventional wisdom in the art (and is counterintuitive to those in the art). Specifically, the use of process heat to solve the global warming problem by extracting carbon dioxide (CO2) from the low concentration ambient air is very attractive compared to both the conventional approach of extracting CO2 from high concentration flue gas sources and other schemes known in the art for extracting CO2 from the ambient atmosphere. In the former case it goes directly against conventional wisdom that 300 times lower concentration of the CO2 in ambient atmosphere would expect it to be 300 times more expensive since separation costs are thought to generally scale inversely with the concentration. Thus federally funded efforts have been directed at extracting CO2 from the flue gas emissions of power plants (e.g. clean coal) and experts have publicly claimed that the use of ambient air as opposed to flue gas makes no sense. However, the large infinite size of the ambient air source compared to the finite flue gas source and sources generally is one feature that enables applicants' approach to be effective in spite of conventional wisdom and practice. In the flue gas case the emissions containing the CO2 are at a higher temperature (65-70 degrees centigrade) and therefore regeneration uses higher temperature heat which is more costly than is needed for the cool ambient air (approximately 25-30 degrees centigrade). There are other benefits of applicants' approach including the ability to use very thin separation devices that also provide further process improvements. Thus, it could be less costly to remove CO2 by piping the process heat to a global thermostat facility that operates on the principles of applicants' invention, rather than cleaning up directly its flue emissions. In addition, the applicants' approach would produce negative carbon, actually reducing the amount of CO2 in the atmosphere, while cleaning up the flue gas would only prevent the CO2 content in the air from increasing.

Further analysis shows that one cannot solve the global warming problem in a timely manner to reduce the great risk it poses by simply cleaning up large stationary fossil fuel sources like coal plants or for that matter by conservation or use of renewables. One needs to actually be able, as is the case in this invention, to extract CO2 from the atmosphere ("negative carbon") thus reducing the ambient concentration and reducing the threat of global warming. Other published schemes for extracting CO2 from the ambient atmosphere have used higher temperature heat generally and not process heat specifically and therefore have not been seriously considered because of their high energy costs.

Additionally, it should be noted that applicants' preferred concept for extracting carbon dioxide from the atmosphere comprises using a large area substrate perpendicular to the air flow, which could be porous with a high surface area, with a medium (e.g. an amine) that removes carbon dioxide from the atmosphere and using process heat to remove carbon dioxide from the medium. Using a relatively large area substrate perpendicular to the direction of air flow is particularly useful, because of the relatively low concentration of carbon dioxide in the atmosphere (as opposed to the relatively high concentration that would normally be found in flue gases, for example).

These and other features of this invention are described in, or are apparent from, the following detailed description (and accompanying drawings) of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
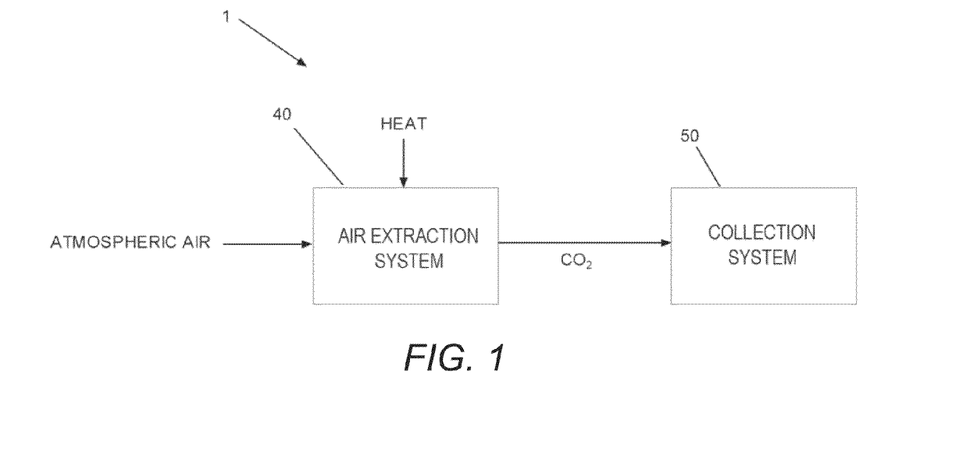
FIG. 1 is a generalized block diagram of a system for removing carbon dioxide from an atmosphere according to an exemplary embodiment of the present invention.

FIG. 1 is a generalized block diagram of a system, generally designated by reference number 1, for removing carbon dioxide from an atmosphere according to an exemplary embodiment of the present invention. The system 1 includes an air extraction system 40 and a collection system 50, that isolates the removed carbon dioxide to a location for at least one of sequestration, storage and generation of a renewable carbon fuel or the generation of a non-fuel product such as fertilizer and construction materials. The air extraction system 40 preferably incorporates any known or later-discovered $CO_2$ extraction method, including methods which use a medium to absorb and/or bind $CO_2$ from the atmospheric air by exposing the medium to chemical, electrical and/or physical interaction with the $CO_2$ in the captured air. The medium may be liquid, gaseous or solid, or a combination of liquid, gaseous and solid substances, where in the case of solids, the substance is preferably porous. The medium is preferably recyclable so that after the $CO_2$ is captured by the medium and separated from the medium for sequestration, the medium can be reused for absorption/binding of additional $CO_2$. However, in other embodiments the medium may be sequestered along with the captured $CO_2$. As shown in FIG. 1, the separation of the $CO_2$ from the medium, as well as other processes such as the absorption/binding of $CO_2$ and the sequestration of the $CO_2$ performed by the sequestration system 50, may be made more efficient by the addition of heat to the air extraction system 40. In the present invention, the heat is process heat generated e.g. by a solar energy generator, such as a solar collector, to be described in further detail below. In other embodiments, process heat may be provided by other types of energy sources, such as, for example, fossil fuel, geothermal, nuclear, biomass, and other renewable energy sources. The term "process heat" as used herein refers to the lower temperature heat remaining after the higher temperature heat has been used to generate electricity. More generally, the term "process heat" refers to any low temperature heat remaining after a primary process or that is added by the process itself, such as, for example, exothermic carbonation reactions in which carbon dioxide is stored as a mineral or in fact when it binds to the medium and is captured. Moreover, "process heat" may be provided from the use of sources of energy to produce products other than power or electrical generation. For example, primary processing such as chemical processing, production of cement, steel or aluminum, production of energy products like coal to liquid energy products, refining, may use heat to drive the primary processing, and the unused heat remaining after the primary processing or created during the primary processing would be the process heat of such processing, and can be used in a system or method according to the principles of the present invention.

Applicants' preferred concept of extracting carbon dioxide from the atmosphere and using process heat to separate carbon dioxide from the collection medium is a significant way of addressing the global warming problem, and goes against the conventional wisdom in the art (and is counterintuitive to those in the art). Specifically, the use of process heat to solve the global warming problem by extracting carbon dioxide (CO2) from the low concentration ambient air is very attractive compared to both the conventional approach of extracting CO2 from high concentration flue gas sources and other schemes known in the art for extracting CO2 from the ambient atmosphere. In the former case it goes directly against conventional wisdom that 300 times lower concentration of the CO2 in ambient atmosphere would expect it to be 300 times more expensive since separation costs are thought to generally scale inversely with the concentration. Thus federally funded efforts have been directed at extracting CO2 from the flue gas emissions of power plants (e.g. clean coal) and experts have publicly claimed that the use of ambient air as opposed to flue gas makes no sense. However, the large infinite size of the ambient air source compared to the finite flue gas source and sources generally is one feature that enables applicants' approach to be effective in spite of conventional wisdom and practice. In the flue gas case the emissions containing the CO2 are at a higher temperature (65-70 degrees centigrade) and therefore regeneration uses higher temperature heat which is more costly than is needed for the cool ambient air (approximately 25-30 degrees centigrade). There are other benefits of applicants' approach including the ability to use very thin separation devices that also provide further process improvements. Thus, it could be less costly to remove CO2 by piping the process heat to a global thermostat facility that operates on the principles of applicants' invention, rather than cleaning up directly its flue emissions. In addition, the applicants' approach would produce negative carbon, actually reducing the amount of CO2 in the atmosphere, while cleaning up the flue gas would only prevent the CO2 content in the air from increasing.

Further analysis shows that one cannot solve the global warming problem in a timely manner to reduce the great risk it poses by simply cleaning up large stationary fossil fuel sources like coal plants or for that matter by conservation or use of renewables. One needs to actually be able, as is the case in this invention, to extract CO2 from the atmosphere ("negative carbon") thus reducing the ambient concentration and reducing the threat of global warming. Other published schemes for extracting CO2 from the ambient atmosphere have used higher temperature heat generally and not process heat specifically and therefore have not been seriously considered because of their high energy costs.

Figure 2:
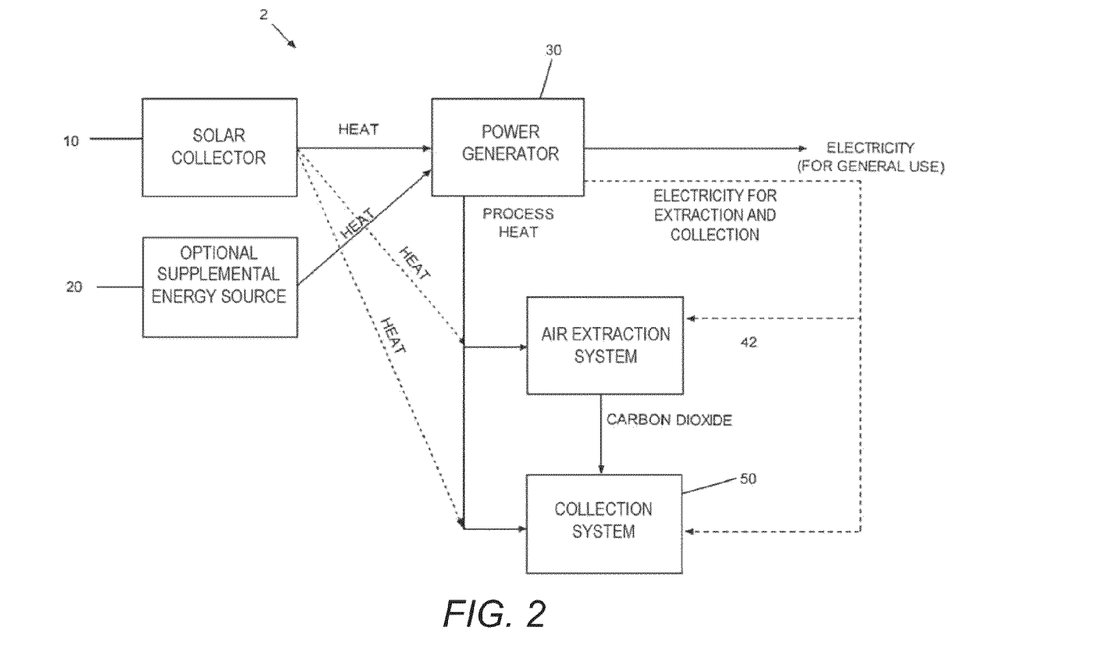
FIG. 2 is a block diagram of a system for removing carbon dioxide from an atmosphere according to an exemplary embodiment of the present invention.

FIG. 2 is a block diagram of a system, generally designated by reference number 2, for removing carbon dioxide from an atmosphere according to an exemplary embodiment of the present invention. The system 2 includes a solar collector 10, an optional supplemental energy source 20, a power generator 30, an air extraction system 42 and a collection system 50. Each of these components of the system 1 are explained in detail below.

The solar collector 10 may be any known or future-discovered solar energy collection system, which may include solar energy collection units, such as, for example, concentrated solar power parabolic mirrors, and concentrated solar power towers. As is known in the art, the solar collector 10 converts solar energy to thermal energy, which may be used to drive the power generator 30. Residual thermal energy (i.e., process heat) may be used to drive the air extraction system 42 and/or the collection system 50. For example, the process heat may be used to improve the efficiency of chemical and/or physical reactions used in the air extraction system 42 to absorb $CO_2$ from the air and/or to drive off the $CO_2$ from the medium. In addition, in other exemplary embodiments, as shown by the dashed arrows in FIG. 2, direct heat from the solar collector 10 may be used to drive the air extraction system 42 and/or the collection system 50.

The power generator 30 may be, for example, a thermal power generator that converts the thermal energy provided by the solar collector to electricity. As is known in the art, the suns heat may be focused on a medium, such as molten salts, that is then used to generate high temperature, high pressure steam that drives a turbine to generate electricity. The generated electricity may then be used to power the other components of the system 2, in addition to providing power to the general population as part of a power grid. In this regard, the thermal energy provided by the solar collector 10 may be supplemented by energy generated by the supplemental energy source 20. For example, the supplemental energy source 20 may be a waste incineration plant, which provides additional thermal energy to drive the power generator 30. Also, it should be appreciated that any other type of renewable energy source may be used in addition to solar energy, and preferably a renewable energy source that produces heat as a precursor to the generation of electricity. Other potential renewable energy sources to be used in addition to solar energy include, for example, nuclear, biomass, and geothermal energy sources.

Alternatively, the power generator 30 may be any known or later discovered fossil fuel facility (plant) that relies on the burning of fossil fuels, such as, for example, coal, fuel oil, natural gas and oil shale, for the generation of electricity. The power generator may also be for a purpose other than generating electricity (for example the power generator could be for chemical processing, or various other purposes like producing aluminum). The thermal energy produced by the fossil fuel power plant 30 is used to produce electricity and the residual thermal energy (i.e., process heat) may be used to drive the air extraction system 42 and/or the sequestration system 50. For example, the process heat from the fossil fuel power plant 30 may be used to improve the efficiency of chemical and/or physical reactions used in the air extraction system 42 to absorb $CO_2$ from the air and/or to drive off the $CO_2$ from the medium. The residual heat provided by the fossil fuel power plant 30 may be supplemented by energy generated by a supplemental energy source. For example, the supplemental energy source may be a waste incineration plant or a renewable energy source, such as, for example, solar, nuclear, biomass, and geothermal energy sources, which provides additional thermal energy to drive the air extraction system 42 and/or the collection system 50. Process heat from the supplemental energy source may also be used to drive the air extraction system 42 and/or the collection system 50.

Moreover, as described above, "process heat" may be provided from the use of sources of energy to produce products other than power or electrical generation. For example, primary processing such as chemical processing, production of cement, steel or aluminum, refining, production of energy products like coal and liquid energy products, may use heat to drive the primary processing, and the unused heat remaining after the primary processing or created during the primary processing would be the process heat of such processing, and can be used in a system or method according to the principles of the present invention.

Figure 3:
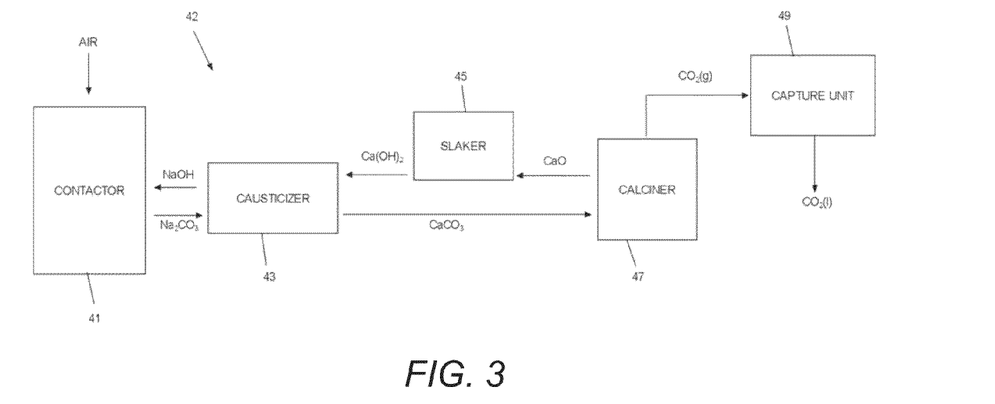
FIG. 3 is a block diagram of an air extraction system according to an exemplary embodiment of the present invention.

FIG. 3 is a block diagram of the air extractor system 42 useable with the system 2 according to an exemplary embodiment of the present invention. The air extractor system 42 includes an air contactor 41, a causticizer 43, a slaker 45, a calciner 47 and a capture unit 49. The air contactor 41 may use a sorbent material to selectively capture $CO_2$ from the air, and may be composed of any known or later-discovered contactor structures, such as, for example, large convection towers, open, stagnant pools, and packed scrubbing towers. In the present embodiment, the sorbent material may be sodium hydroxide (NaOH), which readily absorbs $CO_2$ from the air. It should be appreciated that other known or future-discovered capture methods may be used, such as, for example, chemical absorption, physical and chemical adsorption, low-temperature distillation, gas-separation membranes, mineralization/biomineralization and vegetation. As a further example, as known in the art, aqueous amine solutions or amine enriched solid sorbents may be used to absorb $CO_2$. Preferably, the sorbent material is regenerated and the capture method requires less than about 100-120° C. heat to regenerate the sorbent material.

In this embodiment, at the air contactor 41, $CO_2$ may be absorbed into an NaOH solution forming sodium carbonate ($Na_2CO_3$), e.g. in the manner described by Stolaroff et all in an article entitled "A pilot-scale prototype contactor for CO2 capture from ambient air: cost and energy requirements", which article can be found at www.ucalgary.ca/~keith/papers/84.Stolaroff.AirCaptureGHGT-8.p.pdf, and is incorporated herein by reference. Of course, other known or future-developed absorbers may also be used as an alternative or in addition to an NaOH solution. The generated $Na_2CO_3$ is then sent to the causticizer 43, where the NaOH is regenerated by addition of lime (CaO) in a batch process. The resulting $CaCO_3$ solid is sent to the calciner 47 where it is heated in a kiln to regenerate the CaO, driving off the $CO_2$ in a process known as calcination. The regenerated CaO is then sent through the slaker 45, which produces slaked lime $Ca(OH)_2$ for use in the causticizer 43.

The capture unit 49 captures the $CO_2$ driven off at the calciner 47 using any know or later-discovered $CO_2$ capturing method that is effective in the low concentrations in which $CO_2$ is present in the atmosphere and that needs only low temperature heat for regeneration. For example, the capture unit 49 may use an amine based capture system, such as the system described in Gray et al U.S. Pat. No. 6,547,854, dated Apr. 15, 2003, and also Sirwardane U.S. Pat. No. 6,908,497, dated Jun. 21, 2005, both of which are incorporated herein by reference. The capture unit 49 may also compress the captured $CO_2$ to liquid form so that the $CO_2$ may be more easily sequestered.

The collection system 50 isolates the removed carbon dioxide to a location for at least one of sequestration, storage and generation of a renewable carbon fuel or the generation of a non-fuel product such as fertilizer and construction materials. The collection system 50 may use any known or future-discovered carbon, sequestration and/or storing techniques, such as, for example, injection into geologic formations or mineral sequestration. In the case of injection, the captured $CO_2$ may be sequestered in geologic formations such as, for example, oil and gas reservoirs, unmineable coal seams and deep saline reservoirs. In this regard, in many cases, injection of $CO_2$ into a geologic formation may enhance the recovery of hydrocarbons, providing the value-added byproducts that can offset the cost of $CO_2$ capture and collection. For example, injection of $CO_2$ into an oil or natural gas reservoir pushes out the product in a process known as enhanced oil recovery. The captured $CO_2$ may be sequestered underground, and according to at least one embodiment of the invention at a remote site upwind from the other components of the system 2 so that any leakage from the site is re-captured by the system 2.

In regards to mineral sequestration, $CO_2$ may be sequestered by a carbonation reaction with calcium and magnesium silicates, which occur naturally as mineral deposits. For example, as shown in reactions (1) and (2) below, $CO_2$ may be reacted with forsterite and serpentine, which produces solid calcium and magnesium carbonates in an exothermic reaction.

$$\tfrac{1}{2}Mg_2SiO_4 + CO_2 = MgCO_3 + \tfrac{1}{2}SiO_2 + 95 \text{ kJ/mole} \quad (1)$$

$$\tfrac{1}{3}Mg_3Si_2O_5(OH)_4 + CO_2 = MgCO_3 + \tfrac{2}{3}SiO_2 + \tfrac{2}{3}H_2O + 64 \text{ kJ/mole} \quad (2)$$

Both of these reactions are favored at low temperatures. In this regard, both the air capture and air sequestration processes described herein may use electricity and/or thermal energy generated by the solar collector 10 (or other renewable energy source) to drive the necessary reactions and power the appropriate system components. In an exemplary embodiment of the present invention, a high temperature carrier may be heated up to a temperature in a range of about 400° C. to about 500° C. to generate steam to run a generator for electricity, and the lower temperature steam that exits from the electrical generating turbines can be used to drive off the $CO_2$ and regenerate the sorbent (e.g., NaOH). The temperature of the high temperature heat, the generated electricity and the temperature of the lower temperature process heat remaining after electricity production can be adjusted to produce the mix of electricity production and $CO_2$ removal that is considered optimal for a given application. In addition, in exemplary embodiments, still lower temperature process heat that emerges out of the capture and sequestration steps may be used to cool equipment used in these steps.

Figure 4:
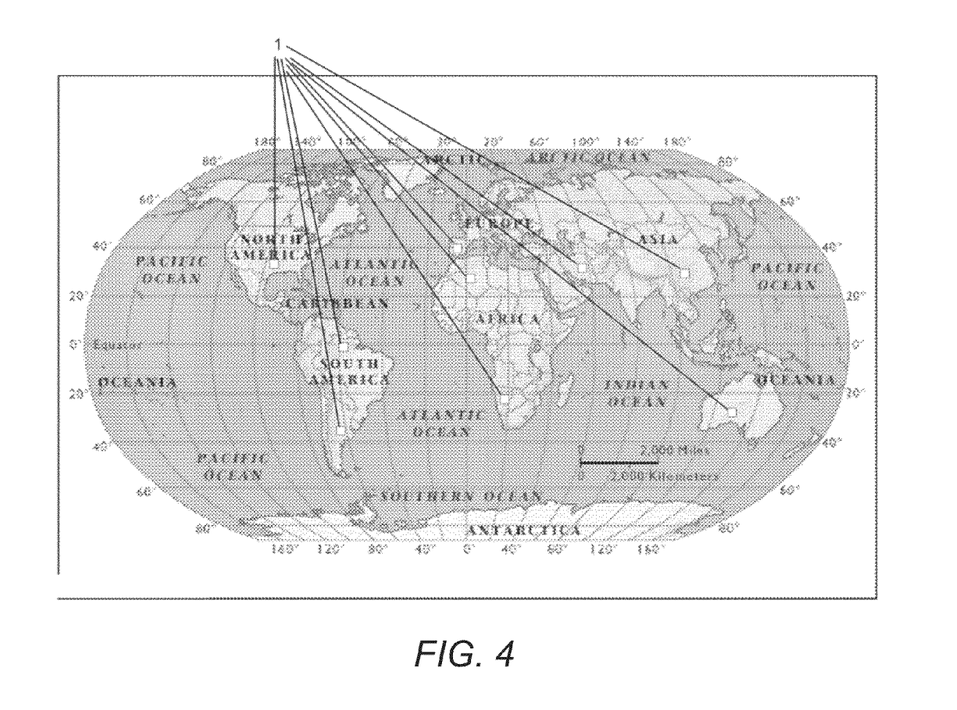
FIG. 4 is a map illustrating a global thermostat according to an exemplary embodiment of the present invention.

One or more systems for removing carbon dioxide from an atmosphere may be used as part of a global thermostat according to an exemplary embodiment of the present invention. By regulating the amount of carbon dioxide in the atmosphere and hence the greenhouse effect caused by carbon dioxide and other gas emissions, the system described herein may be used to alter the global average temperature. According to at least one exemplary embodiment of the present invention, several carbon dioxide capture and sequestration systems may be located at different locations across the globe so that operation of the multiple systems may be used to alter the $CO_2$ concentration in the atmosphere and thus change the greenhouse gas heating of the planet. Locations may be chosen so as to have the most effect on areas such as large industrial centers and highly populated cities, or natural point sources of $CO_2$ each of which could create locally higher concentrations of $CO_2$ that would enable more cost efficient capture. For example, as shown in FIG. 4, multiple systems 1 may be scattered across the globe, and international cooperation, including, for example, international funding and agreements, may be used to regulate the construction and control of the systems 1. In this regard, greenhouse gases concentration can be changed to alter the average global temperature of the planet to avoid cooling and warming periods, which can be destructive to human and ecological systems. During the past history of our planet, for example, there have been many periods of glaciation and rapid temperature swings that have caused destruction and even mass extinctions. Such temperature swings in the future could be a direct cause of massive damage and destabilization of human society from conflicts resulting from potential diminished resources. The global thermostat described herein may be the key to preventing such disasters in the decades to come.

Figure 5:
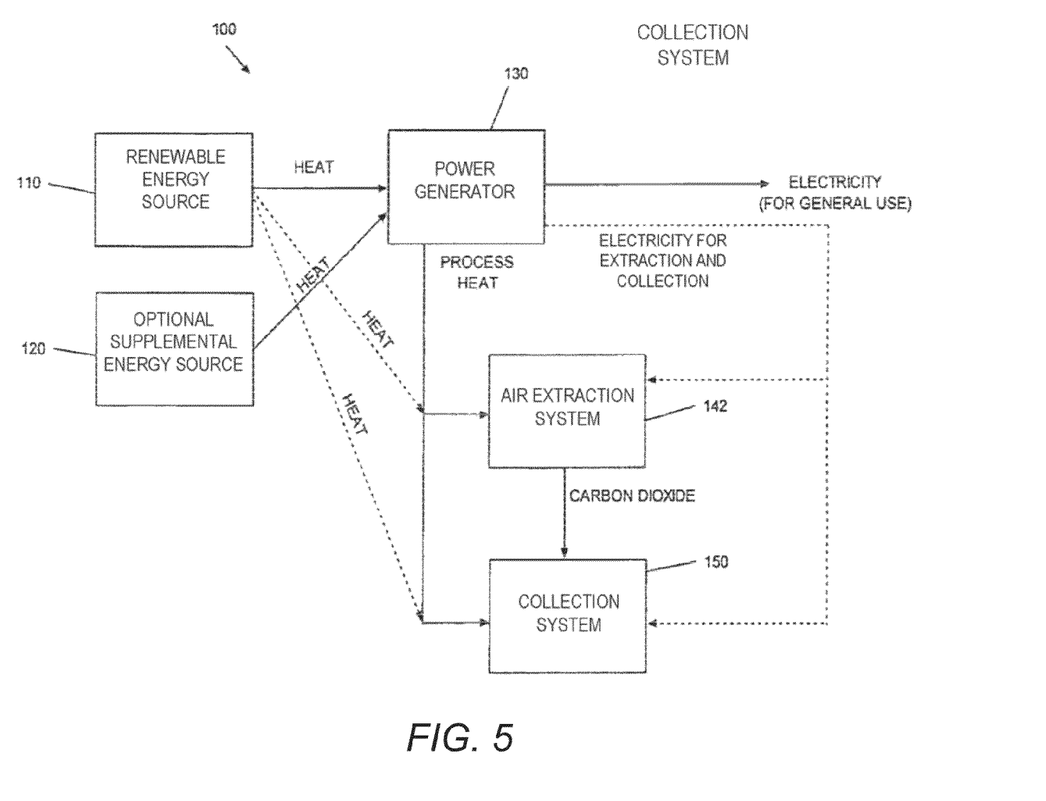
FIG. 5 is a block diagram of a system for removing carbon dioxide from an atmosphere according to an exemplary embodiment of the present invention.

FIG. 5 is a block diagram of a system, generally designated by reference number 100, for removing carbon dioxide from an atmosphere according to another exemplary embodiment of the present invention. The system 100 includes a renewable energy source 110, an optional supplemental energy source 120, a power generator 130, an air extraction system 142 and a collection system 150. The present embodiment differs from the embodiment of FIG. 2 in that the renewable energy source 110 may be any known or future-discovered energy source besides solar, such as, for example, nuclear, geothermal, and biomass energy sources. Preferably, the renewal energy source produces thermal energy, which can be used to produce electricity and to improve the efficiency of the various chemical and/or physical reactions that take place within the air extraction system 142 and the collection system 150. In this regard, the air extraction system 142 and the collection system 150 may be the same as described with reference to the previous embodiment, or may include components according to any other known or future-discovered air extraction and collection systems. In addition, as shown in FIG. 4 with reference to the previous embodiment, a plurality of systems 100 may be strategically placed across the globe, and control of the systems 100 may be coordinated so as to collectively function as a global thermostat.

FIGS. 6-9 are schematic illustrations of several ways that carbon dioxide can be removed from an atmosphere, according to the principles of the present invention.

Figure 6:
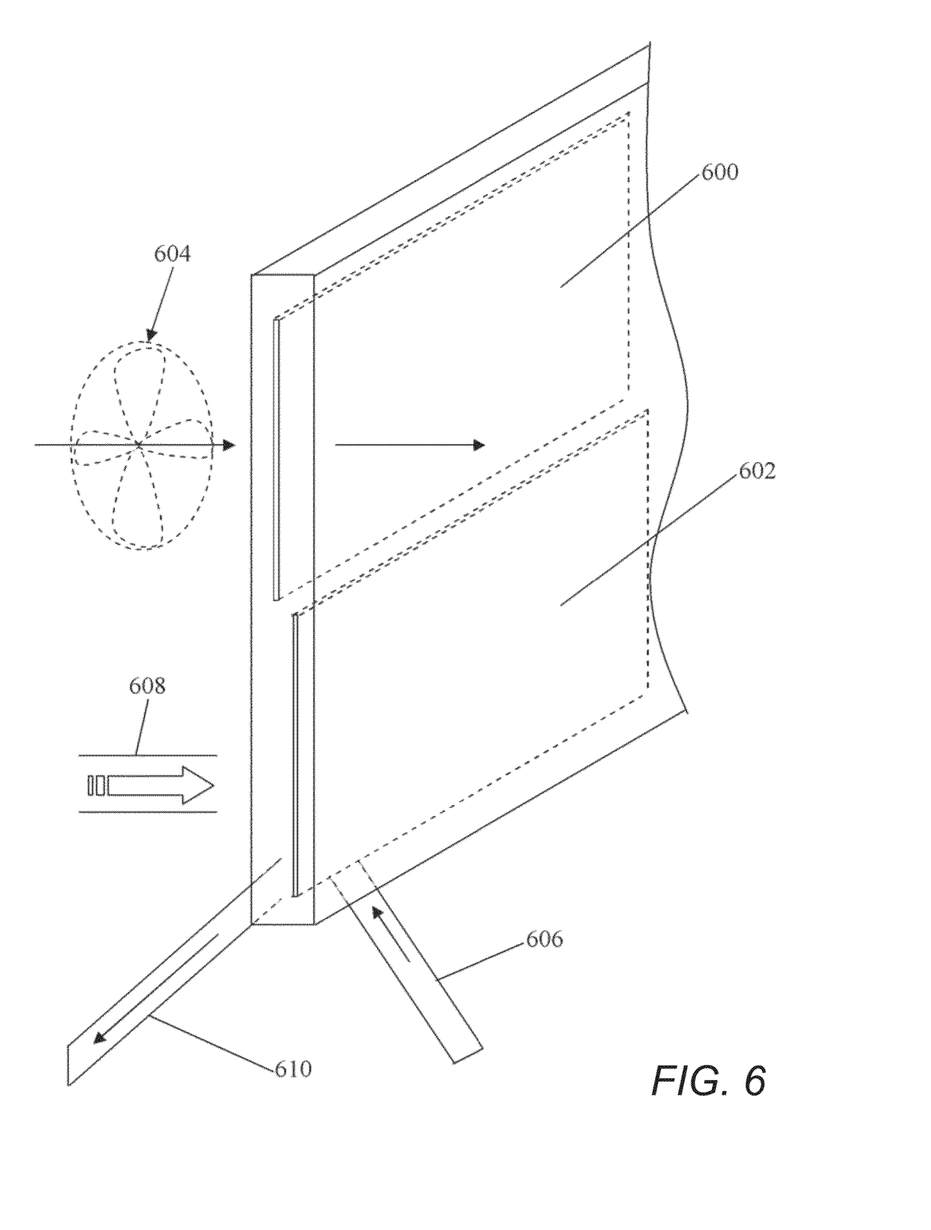
FIG. 6 is a schematic illustration of one version of a medium for removing carbon dioxide from an atmosphere and for removing carbon dioxide from the medium, according to the principles of the present invention.

Specifically, in FIG. 6, a pair of substrate 600, 602 are illustrated, each of which has a medium (e.g. NAOH, an amine) that can be brought into contact with an atmosphere to remove carbon dioxide from the atmosphere. The substrates 600, 602 are pancake shaped (in the sense that they are relatively large area compared to their thickness) oriented vertically, and can each be relatively large (in surface area) and relatively thin (e.g. on the order of a few millimeters, and preferably not thicker than a meter). Each substrate can move (e.g. by a pulley system (not shown) between an upper position in which carbon dioxide laden air is brought into contact with the medium carried by the substrate to remove carbon dioxide from the air, and a lower position in which process heat is directed at the substrate to remove carbon dioxide from the medium. The substrates 600, 602 are porous with large surface areas, so that air directed at a substrate can flow through the substrate. When a substrate is in an upper position (e.g. the position of substrate 600), carbon dioxide laden air is directed at the substrate (e.g. by a fan 604 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the lower position (e.g. the position of substrate 602), process heat is directed at the substrate (e.g. via a fluid conduit 606), and carbon dioxide is removed (drawn off) by a source of fluid that is directed at the substrate (in the direction shown by arrow 608) and a source of suction 610 by which carbon dioxide that has been removed from the medium is drawn away from the substrate. The substrates 600, 602 can alternatively move between the upper and lower positions, so that the substrate in the upper position is removing carbon dioxide from the air and carbon dioxide is being removed from the substrate in the lower position. It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 7:
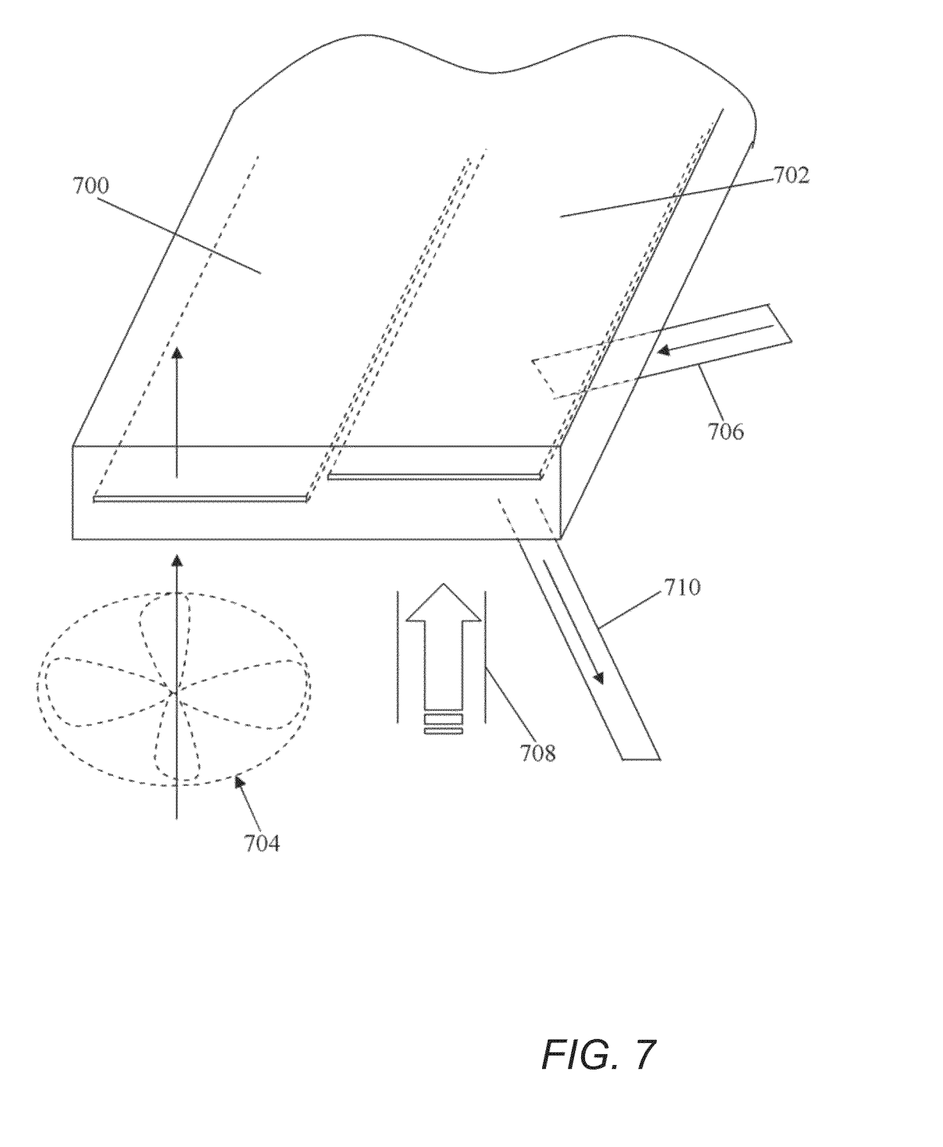
FIG. 7 is a schematic illustration of another version of a medium for removing carbon dioxide from an atmosphere and for removing carbon dioxide from the medium, according to the principles of the present invention.

FIG. 7 is a schematic illustration of another version of a medium for removing carbon dioxide from an atmosphere and for removing carbon dioxide from the medium, according to the principles of the present invention. Specifically, in FIG. 7, a pair of substrates 700, 702 are illustrated, each of which has a medium (e.g. NAOH, an amine) that can be brought into contact with an atmosphere to remove carbon dioxide from the atmosphere. The substrates 700, 702 are oriented horizontally, and can each be relatively large (in surface area) and relatively thin (e.g. on the order of millimeters or centimeters). Each substrate can move horizontally (e.g. by a pulley system (not shown) between an air extraction position in which carbon dioxide laden air is brought into contact with the medium carried by the substrate to remove carbon dioxide from the air, and a carbon extraction position in which process heat is directed at the substrate to remove carbon dioxide from the medium. The substrates 700, 702 are porous, so that air directed at a substrate can flow through the substrate. When a substrate is in an air extraction position (e.g. the position of substrate 700), carbon dioxide laden air is directed at the substrate (e.g. by a fan 704 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the carbon extraction position (e.g. the position of substrate 702), process heat is directed at the substrate (e.g. via a fluid conduit 706), and carbon dioxide is removed (drawn off) by a source of fluid that is directed at the substrate (in the direction shown by arrow 708) and a source of suction 710 by which carbon dioxide that has been removed from the medium is drawn away from the substrate. The substrates 700, 702 can alternatively move between the air extraction and carbon extraction positions, so that the substrate in the air extraction position is removing carbon dioxide from the air and carbon dioxide is being removed from the substrate in the carbon extraction position It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 9:
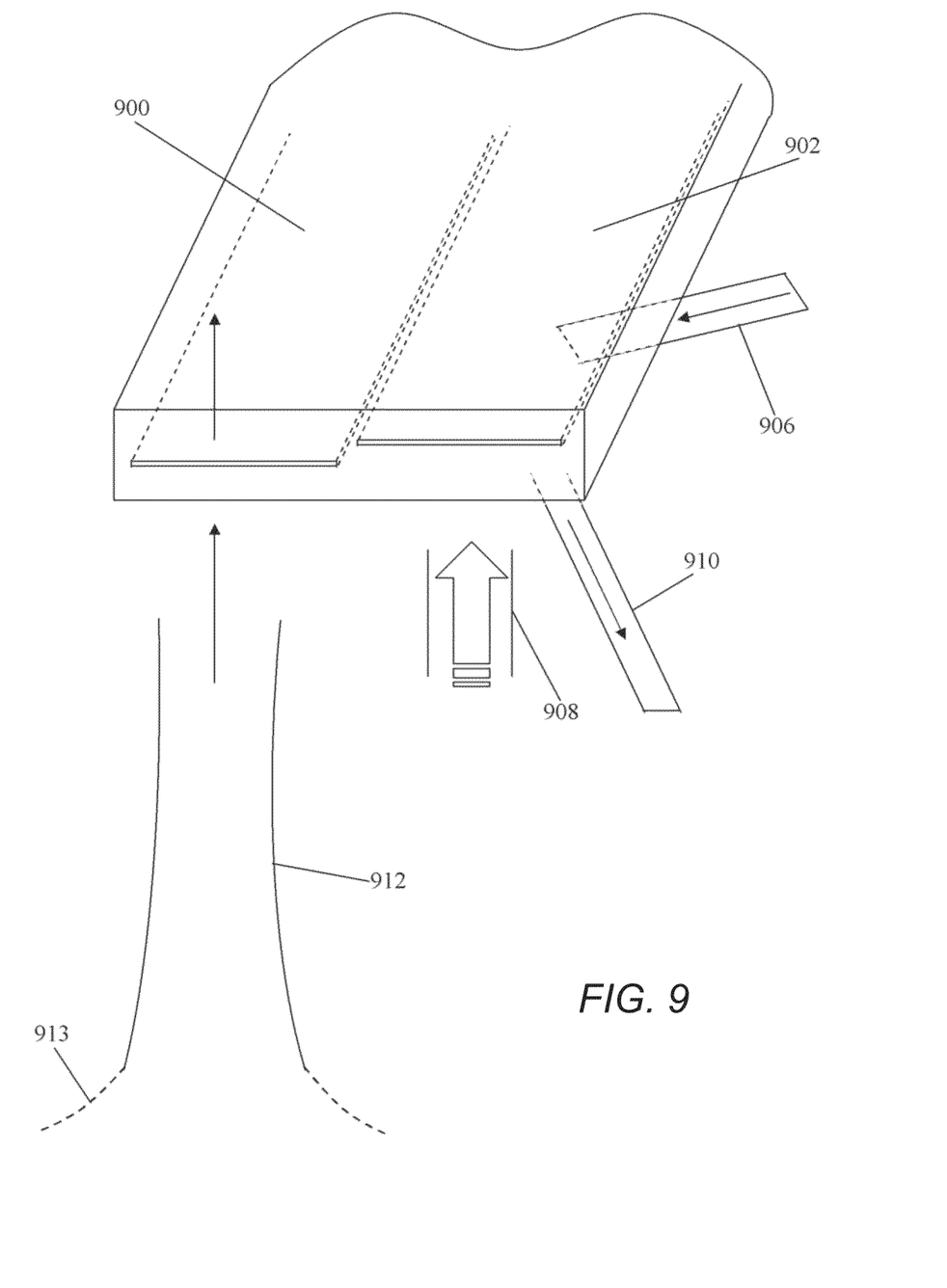
FIG. 9 is a schematic illustration of yet another version of a medium for removing carbon dioxide from an atmosphere and for removing carbon dioxide from the medium, according to the principles of the present invention.

The version of the invention shown in FIG. 9 is generally similar to the horizontally oriented version of FIG. 7, but in the version of FIG. 9, rather than a fan being the source that moves the carbon laden air through the substrate in the air extraction position (e.g. substrate 900), there is a source of gas flow that is generated from a solar heating tower or chimney (shown schematically at 912 in FIG. 9). A solar chimney can be generated by heating an air mass with the sun. The solar chimney would have a "skirt" (shown in dashed lines 913 in FIG. 9) that enables the solar heated air to be concentrated in the chimney. Thus, a solar field with a solar chimney can be associated with a system and structure that removes carbon dioxide from the atmosphere and removes carbon dioxide from a medium in the manner shown and described in connection with FIG. 7. However, rather than a fan 704 as the primary driver of carbon dioxide laden air at the substrate, the carbon dioxide laden air is heated by solar energy and that air is allowed to rise in the solar funnel or tower 912. Because of the tendency for the hot air to rise, an upward draft is generated, that would carry with it carbon dioxide laden air, and the substrate 900 would be positioned in the way of that upward draft. Thus, the carbon dioxide laden air would be directed through the substrate 900 in the air extraction position, and carbon dioxide would be removed from the substrate 902 in the carbon extraction position in the same way as shown and described in connection with FIG. 7. By driving the extraction of carbon dioxide from air by solar energy, the costs of extraction are further reduced, and the overall operation is highly renewable. Of course, provision would need to be made for those periods when the sun didn't shine, and some form of driver similar to the fan 704 (FIG. 7) would be needed. But in any case, having periods in which, instead of the fan, replacing the fan with a solar driven source (or by either wind or thermally-driven air currents), the efficiency and cost reduction of extraction of carbon dioxide from atmospheric air can be further improved.

Figure 8:
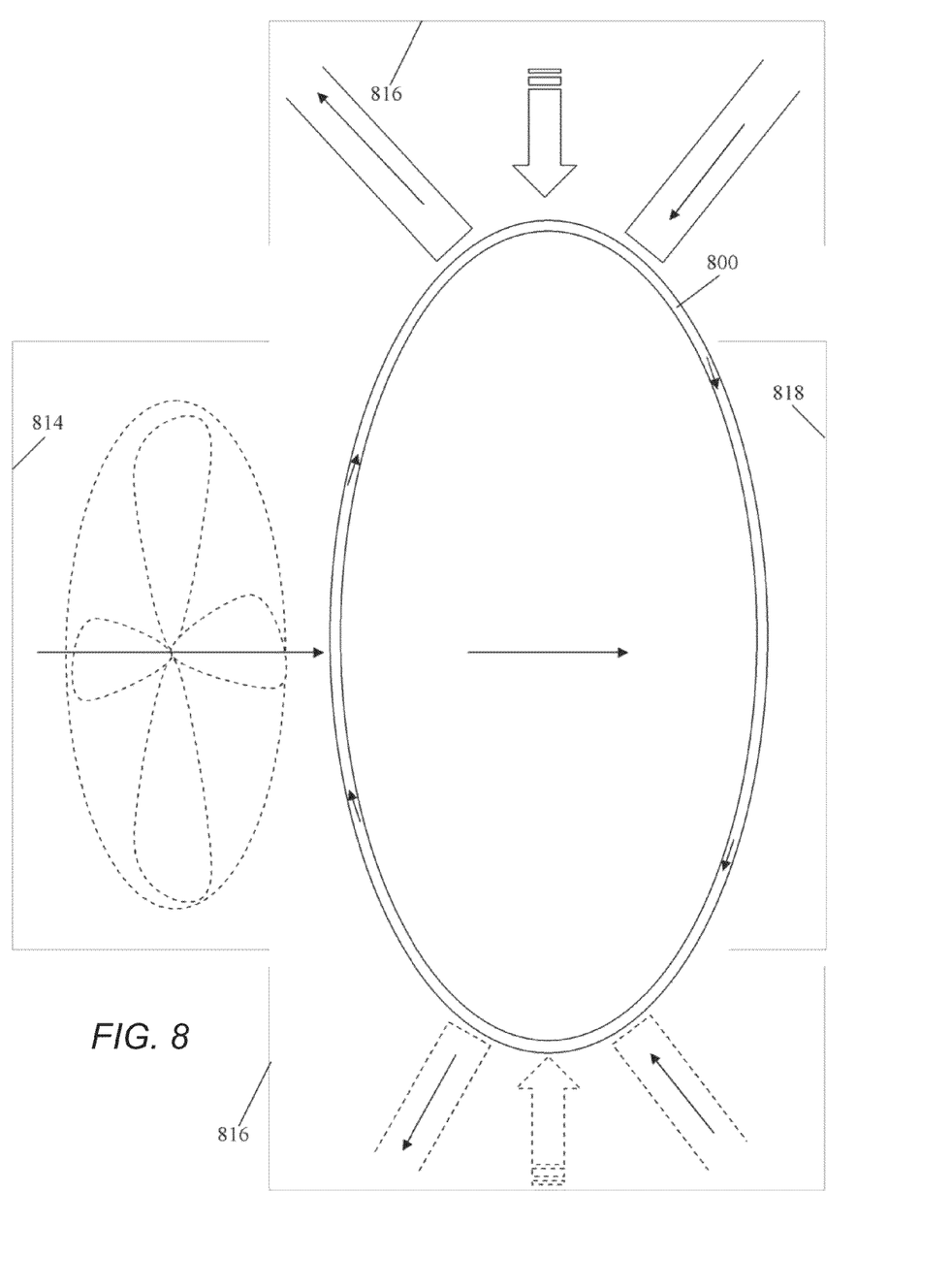
FIG. 8 is a schematic illustration of still another version of a medium for removing carbon dioxide from an atmosphere and for removing carbon dioxide from the medium, according to the principles of the present invention.

FIG. 8 is a schematic illustration of yet another version of a medium for removing carbon dioxide from an atmosphere and for removing carbon dioxide from the medium, according to the principles of the present invention. In FIG. 8, the medium from which carbon dioxide is removed from atmospheric air and from which carbon dioxide is removed from the medium is disposed on a continuously moving substrate 800. The substrate moves through an air extraction zone 814, where carbon dioxide laden air is directed at and through the substrate (which is also porous as with the prior embodiments) so that carbon dioxide is removed from the air. The substrate 800 then moves to a carbon extraction zone 816, where process heat is directed at the substrate and carbon is drawn away from the substrate in the manner described above in connection with FIGS. 6, 7. Then, the substrate 800 moves to and through a heat exchange zone 818 where the temperature of the substrate is lowered (e.g. by the air that flowed through the substrate in the air extraction zone, and by any additional cooling device that may be useful in reducing the temperature of the substrate to a level that enables it to efficiently remove carbon dioxide from the air when the substrate moves back through the extraction zone 814. In addition, the system of FIG. 8 may have another carbon extraction zone 816, where process heat is directed at the substrate and carbon is drawn away from the substrate in the manner described above in connection with FIGS. 6, 7.

It should also be noted that in all of the versions of the invention described above, the removal of carbon dioxide from the air can be at least partially performed under non equilibrium conditions. Additionally, it should be noted that applicants' preferred concept for extracting carbon dioxide from the atmosphere comprises using a relatively thin, large surface area substrate with a medium (e.g. an amine) that removes carbon dioxide from the atmosphere and using process heat to remove carbon dioxide from the medium. Using a relatively large area substrate perpendicular to the direction of air flow is particularly useful, because of the relatively low concentration of carbon dioxide in the atmosphere (as opposed to the relatively high concentration that would normally be found, e.g. in flue gases).

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for extracting carbon dioxide from the atmosphere to reduce the ambient concentration of $CO_2$ in the planet's atmosphere, the method comprising:
    at a first location, collecting and passing air under ambient conditions from the atmosphere to and through a $CO_2$ sorbent medium which comprises a porous solid pancake shaped substrate, on the surface of which is attached an amine sorbent medium, to absorb carbon dioxide from the ambient atmosphere with the amine;
    moving the carbon dioxide-containing sorbent medium to an enclosed collector chamber and passing process heat steam at a temperature of less than about 120° C. into contact with the sorbent medium to remove carbon dioxide from the sorbent medium and to regenerate the sorbent medium;
    removing the $CO_2$ from the collector chamber and isolating the removed carbon dioxide to a location for at least one of storage and generation of a renewable carbon fuel,
    and returning the regenerated sorbent medium to the first location to extract additional $CO_2$ from the atmosphere.

2. The method of claim 1 wherein at least one of the collecting, removing and isolating steps is performed using one or more renewable energy sources.

3. The method of claim 1 wherein the primary energy source for the process heat is selected from the group of primary energy sources consisting of: fossil fuel, geothermal, nuclear, solar, biomass and other renewable energy sources and exothermic chemical processes whose use for a primary process can result in a supply of process heat.

4. The method of claim 1 wherein the location of at least one of the first location, collector chamber and isolating location is underground.

5. The method of claim 1 wherein the process heat is obtained from an adjacent source of carbon dioxide emissions.

6. The method of claim 1 wherein the steam provided to the collector chamber is at a temperature of not greater than 100° C.

7. The method of claim 1 wherein the removed carbon dioxide is used for the generation of a renewable carbon fuel.

8. The method of claim 1 further comprising carrying out the method at a plurality of locations strategically placed across the Globe, and coordinated so as to collectively function for extracting $CO_2$ from the atmosphere.

* * * * *